June 7, 1955  J. B. PICARD  2,710,087
AIR OPERATED FRICTION CLUTCH

Filed Dec. 27, 1949  4 Sheets-Sheet 1

JOHN B. PICARD,
INVENTOR.

BY Lyon&Lyon
ATTORNEYS

June 7, 1955    J. B. PICARD    2,710,087
AIR OPERATED FRICTION CLUTCH
Filed Dec. 27, 1949    4 Sheets-Sheet 2
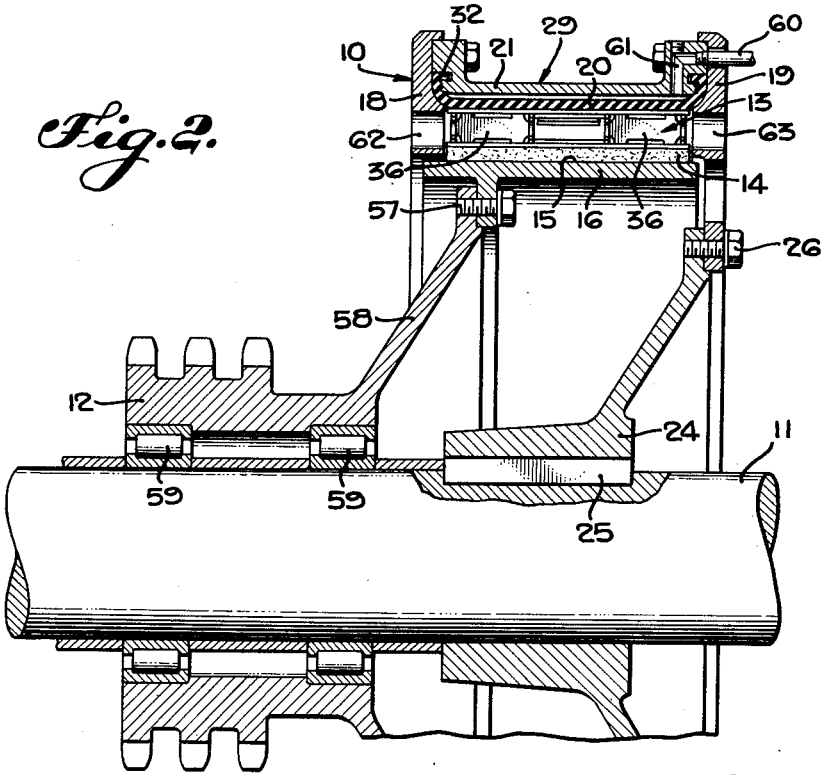
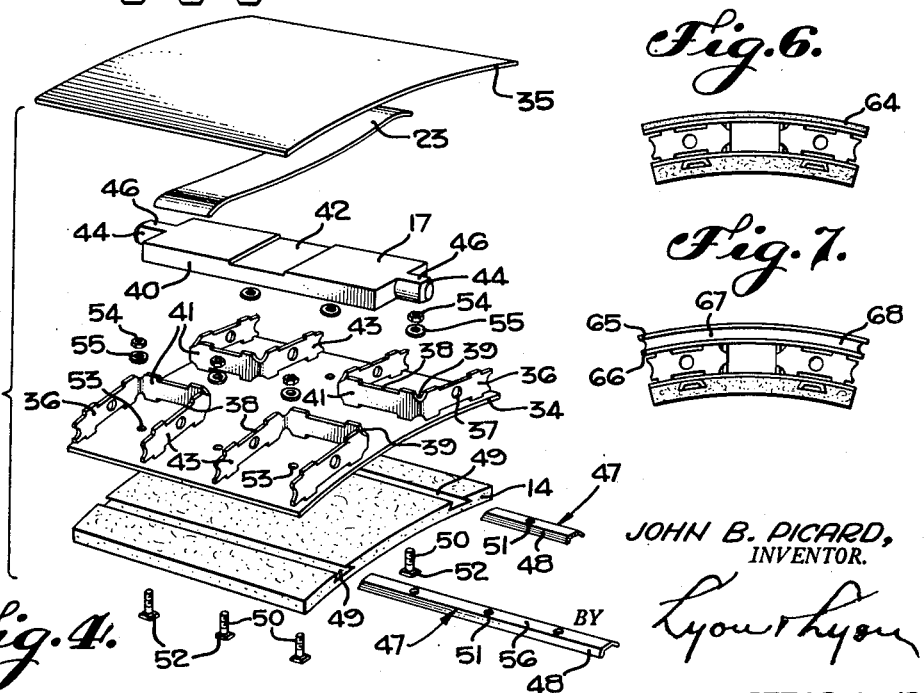
JOHN B. PICARD,
INVENTOR.
BY
ATTORNEYS

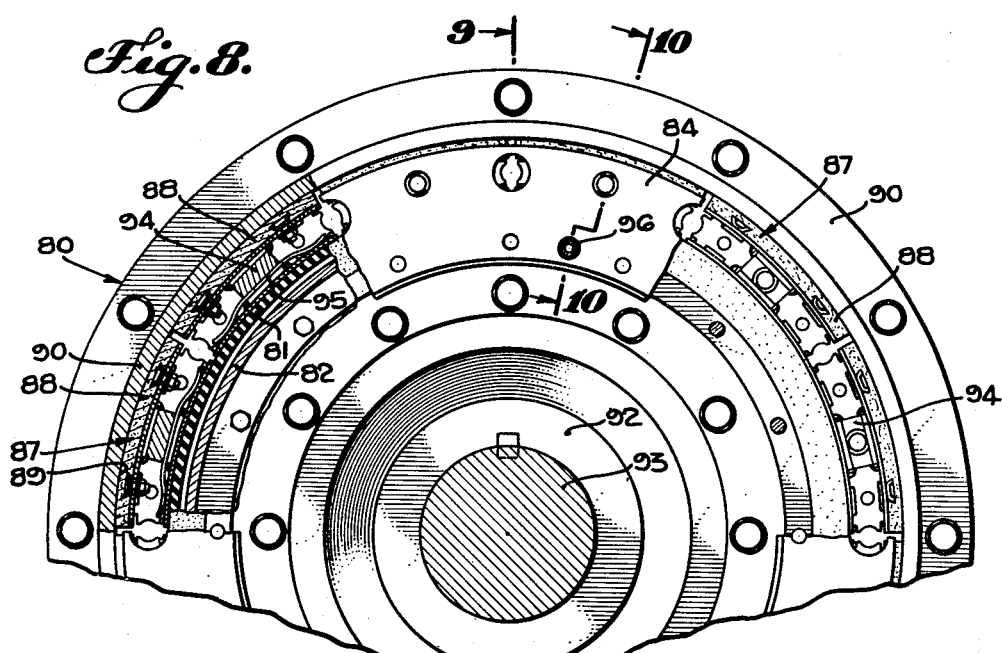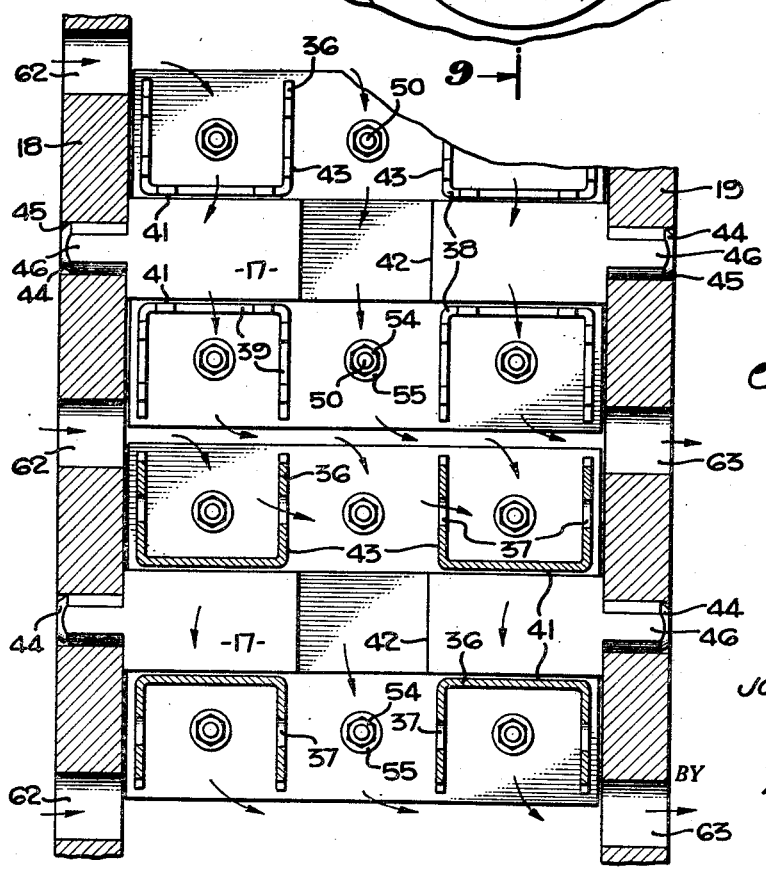

JOHN B. PICARD, INVENTOR.

BY Lyon & Lyon

ATTORNEYS

United States Patent Office 2,710,087
Patented June 7, 1955

2,710,087

AIR OPERATED FRICTION CLUTCH

John B. Picard, Los Angeles, Calif., assignor to The National Supply Company, Pittsburgh, Pa., a corporation of Pennsylvania Application December 27, 1949, Serial No. 135,050

6 Claims. (Cl. 192—88)

This invention relates to friction clutches and is particularly directed to improvements in air operated friction clutches of the general type shown in the United States Patent to C. S. Smith, No. 1,047,713, granted December 17, 1912.

The principal object of this invention is provide an improved air operated friction clutch employing a plurality of shoes moved toward engagement with a cylindrical friction surface by means of a cylindrical rubber-like diaphragm operated by air pressure.

Another object is to provide an improved clutch assembly of this type in which the shoe and friction lining attached thereto are normally retracted from operative position by means of a leaf spring acting against a torque bar, the shoe and lining, spring, and torque bar comprising a unitary assembly which may be inserted or withdrawn as a unit into operative position.

Another object is to provide an improved form of pressure responsive cylindrical diaphragm for actuating the shoes and lining toward operative position.

Another object is to provide an improved form of shoe for a clutch assembly of this type, the shoe being of light-weight construction and yet with sufficient strength and stiffness to carry the load imposed upon it, and having provision for air circulation through ports in various parts of the shoe to promote adequate cooling.

A more detailed object is to provide an improved form of connection for securing friction lining to the shoe which supports it. Other and more detailed objects and advantages will appear hereinafter.

In the drawings:

Figure 2 is a sectional view partly broken away taken substantially on the lines 2—2 as shown in Figure 1.

Figure 4 is an exploded view showing the construction of one of the shoes, together with the manner of its assembly with respect to the torque, bar, retraction spring and friction lining.

Figure 5 is a developed view in diagrammatic form, partly in section, showing the path of circulation of air for cooling the friction shoes and for dissipating the heat developed by the contact of the friction lining with the rotary friction surface which it engages.

Figure 6 shows a modified form of shoe employing asbestos insulation on its outer radius.

Figure 7 shows a further modified form of shoe having spaced outer plates with clearance therebetween for cooling.

Figure 8 is a view similar to Figure 1 but showing a modified form of clutch assembly having internally expanding shoes.

Figure 1:
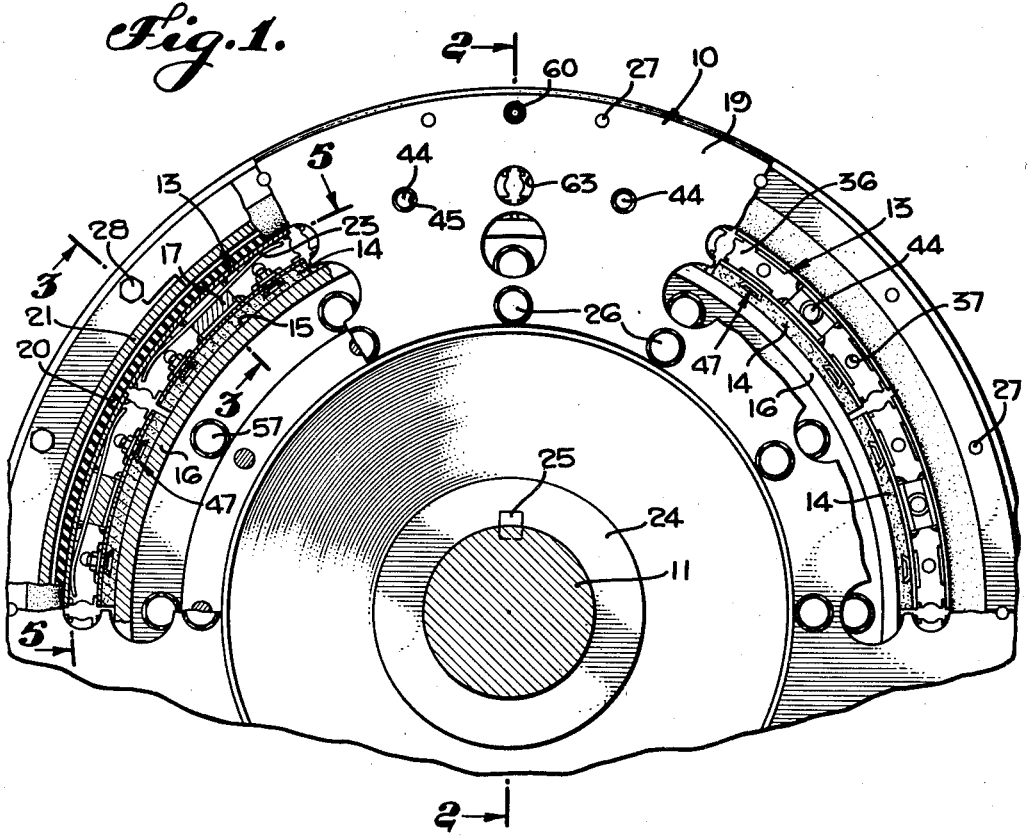
Figure 1 is an end elevation partly broken away and partly in section showing a friction clutch assembly embodying my invention.
Figure 3:
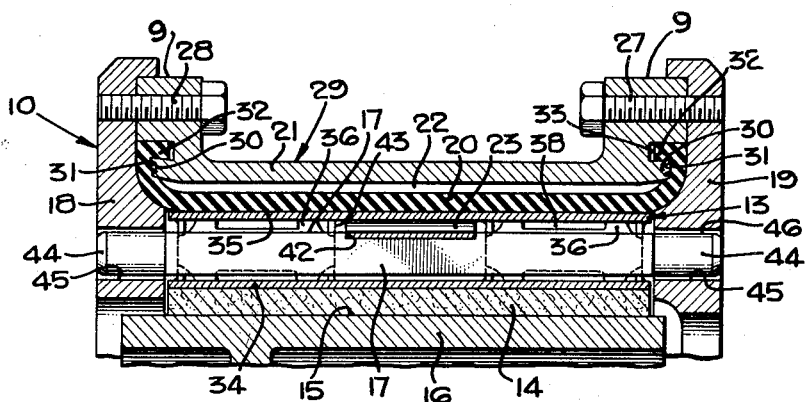
Figure 3 is an enlarged sectional elevation partly broken away taken substantially on the lines 3—3 as shown in Figure 1.

Referring to the drawings, the friction clutch assembly generally designated 10 is provided for selectively connecting the shaft 11 with the rotary sprocket 12. Briefly stated, the clutch assembly 10 includes a plurality of radially movable shoes 13 each having a block of friction lining 14 secured thereto which is adapted for frictional engagement with cylindrical surface 15 on the drum 16. A torque bar 17 extends through the interior of each shoe 13 and the projecting ends of the torque bar are received in openings provided on the end flanges 18 and 19. Each shoe 13 is radially movable with respect to its torque bar 17 under the force applied by the pressure actuated cylindrical diaphragm 20 which extends between the end flanges 18 and 19. A housing 21 encircles the diaphragm 20 and extends axially between the end flanges 18 and 19. Cooperating parts on the housing 21 and end flanges 18 and 19 serve to clamp the ends of the cylindrical diaphragm 20 with respect to the housing 21 and flanges 18 and 19.

Air pressure admitted into the annular chamber 22 defined between the diaphragm 20 and housing 21 serves to move the diaphragm 20 and shoes 13 radially inwardly to effect a frictional engagement between the lining 14 and the friction surface 15 on the drum 16. A circumferentially extending leaf spring 23 is provided within each of the shoes 13.

The central portion of this spring bears against the torque bar 17 and the outer ends engage within the shoe 13 so that the force of the spring acts to retract the shoe 13 radially outwardly to separate the lining 14 from the friction surface 15.

Proceeding to the description of the various parts in more detail, the flanged hub 24 may be connected to the rotary shaft 11 by means of a suitable key 25, and this hub 24 may support the end flange 19 by means of the bolted connections 26. The flange 19 is in turn bolted to the housing 21 by means of the threaded connecting elements 27, and the flange 18 is bolted to the housing by means of similar elements 28. The threaded elements 27 and 28 pass through radially extending rims 9 formed integrally on the ends of the housing 21. The housing 21 and flanges 19 function as a unit in service and in effect comprise a body generally designated 29.

The diaphragm 20 may be molded of natural or synthetic rubber or rubber-like material and is held in place at its opposed ends by means of annular clamping fins 30 which engage radially extending flanges 31 on the diaphragm. Inwardly directed lips 32 extend from the flanges 31 and are received within tapered recesses 33 provided within the rims 9 on the housing 21. The parts just described serve to clamp the outer ends of the rubber diaphragm securely to the housing 21 so that air pressure cannot leak through the clamping means. The cylindrical diaphragm 20 and its mounting on the body 29 provide a relatively simple yet highly effective air operated means for moving the shoes 13 toward operating position. The diaphragm 20 has only a single wall and does not comprise an inflatable tube of the type shown in the said patent to Smith. The diaphragm is easier to construct and more reliable in operation. It will be understood that the cylindrical diaphragm 20 defines the inner wall of the annular pressure chamber 22 and that the housing 21 forms the outer wall for said pressure chamber.

Each of the friction shoes 13 includes an arcuate base plate 34 and an arcuate cover plate 35 connected to spacers 36. The spacers 36 are welded or otherwise securely fixed to the arcuate plates 34 and 35. Each of the spacers 36 comprises a U-shaped strip mounted on edge and provided with apertures 37 and cut-out recesses 38 and 39 for passage of air. I prefer to employ four spacers for each of the shoes 13 with the spacers positioned at the corners of the plates 34 and 35 so that both transverse and circumferential clearance openings are defined between the spacers. The torque bar 17 is received in the transverse opening and the parallel edges 40 on the torque bar are contacted by the end members 41 of the spacer bars. A shallow slot 42 may be provided in the outer surface of the torque bar 17 for reception of the leaf spring 23. The leaf spring 23 extends within the circumferential recess defined between the parallel side portions 43 of the spacers 36, and the outer ends of the spring 23 engage under the arcuate cover plate 35. When the torque bar 17 and spring 23 are assembled with respect to the shoe 13 the parts remain in assembled position because of the cooperative engagement between the spring 23 and the slot 42 in the torque bar 17.

Projecting trunnions 44 on each end of the torque bar 17 are received within cylindrical apertures 45 provided in the end flanges 18 and 19. As best shown in Figure 1 the projecting trunnions 44 on the torque bar 17 fit closely within the apertures 45 so that the torque bar 17 may have tilting movement but cannot move radially with respect to the end flanges 18 and 19. The trunnions 44 are not completely cylindrical but as shown clearly in Figure 4 flat areas 46 form a portion of each trunnion, and these flat areas are coplanar with the upper and lower surfaces of the torque bar.

Means are provided for securing the friction lining blocks 14 to the shoes 13, and as shown in the drawings this means includes a plurality of metallic anchor strips 47 having diverging sides 48. These strips are adapted to be inserted endwise into matching dovetail grooves 49 provided in the friction lining block 14. Bolts 50 extend through spaced apertures 51 provided in the anchor strips 47, and the head 52 of each bolt is received within the dovetail groove 49 and between the diverging legs 48. Apertures 53 in the arcuate base plate 34 register with the apertures 51 in the anchor strips 47 so that the bolts 50 extend upwardly through the apertures 53. Nuts 54 and washers 55 complete the attachment of the friction lining block 14 to the arcuate base plate 34 of the shoe 13. It will be observed that the ends of the spacers 36 are open to provide clearance so that a suitable wrench (not shown) can be inserted to tighten the nuts 54 on the bolts 50. The square heads 52 on the bolts are prevented from turning by reason of their engagement with the diverging legs 48 of the anchor strips 47. When the friction lining block 14 has been secured to the shoe 13 the upper surface 56 of each anchor strip 47 lies below the lower surface of the arcute base plates 34 so that the friction lining block 14 is firmly secured.

When the cylindrical diaphragm 20 contracts upon introduction of air pressure into the annular chamber 22, the shoes 13 move radially inwardly with respect to the torque bars 17. The lining 14 on the shoes engages the friction surface 15 on the drum 16. The drum 16 may be secured by means of threaded connections 57 to a flange 58 extending from the hub of the sprocket 12. Spaced bearings 59 may be provided for rotatably supporting the sprocket 12 on the shaft 11.

In the operation of the device air pressure is admitted into the annular pressure chamber 22 through supply pipe 60 and passageway 61 formed in the housing 21. Since the inner diameter of the cylindrical rubber diaphragm 20 rests on the shoes 13, radial contraction of the diaphragm 20 under the influence of pressure in the chamber 22 causes the shoes 13 to move radially inwardly in opposition to the force of the leaf springs 23. The shoes 13 are of lightweight composite construction as described above, and hence the tendency of the shoes 13 to move outwardly under centrifugal force is minimized. When the pressure in the chamber 22 builds up sufficiently the friction contact between the lining 14 and drum 16 establishes a driving connection between the shaft 11 and sprocket 12. The torque is transmitted from the body 29 to the torque bars 17 and then to the shoes 13 through the end members 41 on the spacers 36. The torque then passes through the anchor strips 47 to the friction lining 14 and thence to the drum 16. Upon release of the air pressure in chamber 22 the leaf springs 23 acting against the torque bars 17 move each of the shoes 13 radially outwardly to separate the friction lining 14 from the drum surface 15.

When the thickness of the lining 14 has worn down after a period of use it may be replaced without requiring that the entire clutch assembly 10 be dismantled. The threaded connections 26 and 27 are removed so that the end plate 19 can be withdrawn in an axial direction. The shoes 13 and lining 14 can then be withdrawn in an axial direction since the torque bars 17 and springs 23 remain assembled with the shoes 13. In other words, each shoe 13, together with its lining 14, torque bar 17 and spring 23, may be withdrawn axially as a unitary assembly from operative position after the end plate 19 has first been removed. Since the springs 23 are each confined within their respective shoes 13 they do not offer any resistance to axial movement of the unitary shoe assemblies from operative position. Similar unitary assemblies of shoes, torque bars, springs and new lining may then be placed in operative position by inserting the trunnions 44 into the apertures 45 in the end flange 18, and then securing the end flange 19 in place.

Means are provided to effect a circulation of air through the friction clutch assembly to prevent overheating of the rubber-like diaphragm 20. As shown in the drawings this means includes the apertures 62 and 63 formed in the end flanges 18 and 19. The means for promoting circulation of air also includes the apertures 37 and cut-out recesses 38 and 39 on the spacers 36 so that a flow of air may take place through the interior of each of the shoes 13 between the arcuate cover and base plates 35 and 34. This flow of air is indicated by the arrows in Figure 5. The springs 23 have been omitted from Figure 5 for purposes of clarity of illustration.

The modified form of shoe shown in Figure 6 is similar in all respects to the shoes 13 described above with the exception that asbestos insulation 64 is applied to the upper surface of the shoe for further protection to the rubber diaphragm 20 against overheating. In the modified form of shoe shown in Figure 7 the upper arcuate plate is formed as two spaced members 65 and 66 with an air space 67 extending between them. The arcuate plates 65 and 66 are connected by means of circumferentially extending ribs 68. In this form of shoe additional cooling is achieved because of the passageways 67, and therefore any tendency to overheat the rubber diaphragm 20 is avoided.

Figure 9:
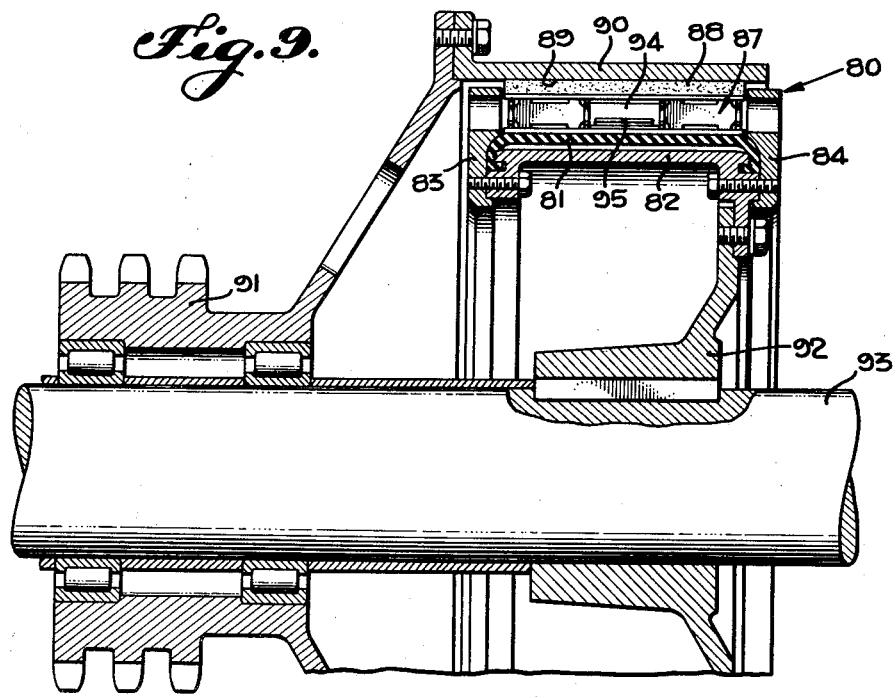
Figure 9 is a sectional view taken substantially on the lines 9—9 as shown in Figure 8.
Figure 10:
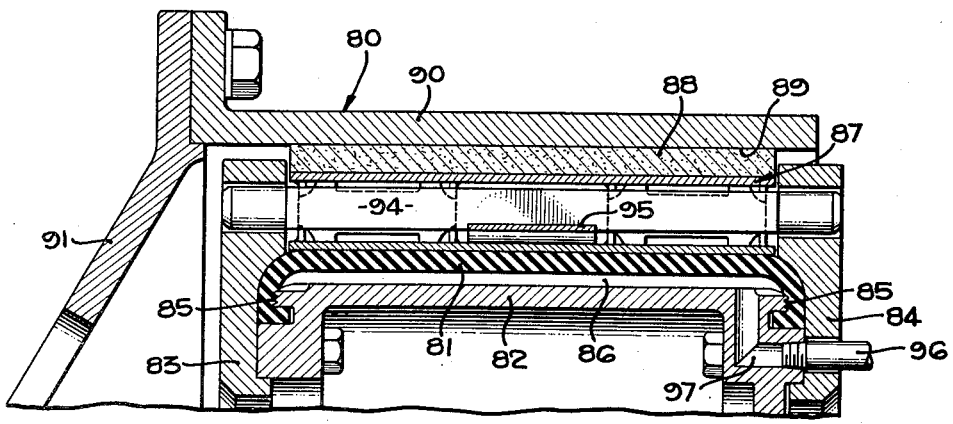
Figure 10 is a sectional view on an enlarged scale taken substantially on the lines 10—10 as shown in Figure 8.

In Figures 8, 9 and 10 I have shown a friction clutch assembly generally designated 80 which is similar in many respects to the friction clutch 10 but differs therefrom principally in that the friction shoes and lining move radially outwardly toward operative position. In other words, the friction clutch 80 is of an internally expanding type instead of externally contracting as shown in Figures 1 to 7. In this modified form of clutch assembly the cylindrical rubber diaphragm 81 is anchored at its opposed ends to a sleeve 82 which extends between the end flanges 83 and 84. Securing means 85 are provided for connecting the ends of the cylindrical diaphragm 81, and these means 85 are substantially the same as that described in connection with Figures 1 to 7. The pressure chamber 86 is defined between the rubber diaphragm 81 and the metallic sleeve 82. The construction of the shoes 87 is similar to that described in connection with the shoes 13 except that the friction lining 88 is secured to the convex face of the shoe instead of the concave face so that the lining may engage the cylindrical friction surface 89 provided within the shell 90. The shell 90 is secured for rotation with the sprocket 91 while the sleeve 82 is connected for rotation with the hub 92 which is keyed to the shaft 93. The internal construction of the shoes 87 and their engagement with the torque bars 94 is substantially the same as that described above. Furthermore, each shoe 87, together with its friction lining 88, spring 95 and torque bar 94, may be removed and replaced as a unit upon removal of the end flange 84. Air pressure admitted to supply pipe 96 passes through passageway 97 formed in the sleeve 82 and into the annular pressure chamber 86. The rubber diaphragm 81 is thus caused to expand radially, thereby moving the shoes 87 radially outwardly to bring the friction lining 88 into contact with the shell 90. When the air pressure within the air chamber 86 is released the springs 95 retract the shoes 87 from operative position.

Having fully described my invention, it is to be understood that I do not wish to be limited to the details herein set forth, but my invention is of the full scope of the appended claims.

I claim:

1. In a fluid actuated friction clutch, the combination of: a pair of relatively rotatable coaxial members, the first member having a cylindrical friction surface, the second member including a rigid element having end flanges detachably secured thereto and provided with a cylindrical surface, a circumferential series of shoe members radially movable to engage said friction surface, a flexible cylindrical diaphragm closely adjacent said cylindrical surface for effecting such movement, said diaphragm having its ends clamped to the rigid element by said end flanges, the diaphragm cooperating with the cylindrical surface of the rigid element to define an annular fluid pressure chamber, means on the second member for introducing a pressure fluid into said chamber, torque bars extending axially between the end flanges, each torque bar passing through one of said shoe members, a circumferentially extending leaf spring confined within each shoe member engaging the torque bar and acting individually to retract the shoe member away from said friction surface, each torque bar, leaf spring and shoe member being independently removable axially as a unit from the rigid element upon removal of one of said end flanges.

2. In a fluid operated friction clutch, the combination of: a pair of relatively rotatable coaxial members, the first member having a cylindrical friction surface, the second member including a body having a rigid cylindrical torque-transmitting element provided with radially extending rims at the opposed ends thereof, each rim having an annular recess, the body also having end flanges detachably secured to said rims, a flexible cylindrical diaphragm cooperating with said rigid cylindrical element to define an annular pressure chamber, the diaphragm having integral radially extending end portions at opposed ends thereof each having an axially directed lip extending into one of said annular recesses, said end portions being clamped axially in fluid tight relationship between the ends of said rigid cylindrical element and said end flanges, a circumferential series of shoe members radially movable to engage said friction surface, torque bars extending axially between said end flanges, each torque bar extending through one of said shoe members, a spring within each shoe member engaging the torque bar to move the shoe member away from said friction surface, means on the second member for introducing a pressure fluid into said chamber to distort the diaphragm and thereby move the shoe members toward said friction surface, each shoe member and its torque bar and spring being removable axially as an independent unit from both of said coaxial members, upon removal of one of said end flanges.

3. In a fluid actuated friction clutch, the combination of: a pair of relatively rotatable coaxial members, the first member including a drum having a cylindrical friction surface, the second member including a rigid housing encircling the drum and having end flanges detachably secured thereto, the housing having an internal cylindrical surface, a circumferential series of shoe members movable radially inwardly to engage said friction surface, a flexible cylindrical diaphragm closely adjacent said cylindrical surface for effecting such movement, said diaphragm having its ends clamped to said rigid housing by said end flanges, the diaphragm cooperating with the cylindrical surface of the housing to define an annular fluid pressure chamber, means on the housing for introducing a pressure fluid into said chamber, torque bars extending axially between said end flanges, each torque bar passing through one of said shoe members, a circumferentially extending leaf spring confined within each shoe member engaging a torque bar and acting individually to retract each shoe member away from said friction surface, each torque bar, leaf spring and shoe member being independently removable axially as a unit from the housing upon removal of one of said end flanges.

4. In a fluid actuated friction clutch, the combination of: a pair of relatively rotatable coaxial members, the first member including a shell having an internal cylindrical friction surface, the second member including a rigid element encircled by the shell and having end flanges detachably secured thereto, the rigid element having an external cylindrical surface, a circumferential series of shoe members movable radially outwardly to engage said friction surface, a flexible cylindrical diaphragm closely adjacent said cylindrical surface for effecting such movement, the diaphragm having its ends clamped to the rigid element by said end flanges, the diaphragm cooperating with the cylindrical surface of the rigid element to define an annular fluid pressure chamber, means on the rigid element for introducing a pressure fluid into said chamber, torque bars extending axially between the end flanges, each torque bar passing through one of said shoe members, a circumferentially extending leaf spring confined within each shoe member engaging the torque bar and acting individually to retract the shoe member away from said friction surface, each torque bar, leaf spring and shoe member being independently removable axially as a unit from the rigid element upon removal of one of said end flanges.

5. In a fluid actuated friction clutch, the combination of: a pair of relatively rotatable coaxial members, the first member including a drum having an external cylindrical friction surface, the second member including a housing comprising a rigid cylindrical torque-transmitting element provided with radially extending rims at the opposed ends thereof, each rim having an annular recess, the second member also having end flanges detachably secured to said rims, a flexible cylindrical diaphragm cooperating with said housing to define an annular pressure chamber, the diaphragm having integral end portions extending radially outwardly at opposed ends thereof, each of said end portions having an axially directed lip extending into one of said annular recesses, said end portions being clamped axially in fluid-tight relationship between the ends of said housing and said end flanges, a circumferential series of shoe members movable radially inwardly to engage said friction surface, torque bars each extending through one of said shoe members, a spring within each shoe member engaging the torque bar to move the shoe member away from its friction surface, means on the second member for introducing a pressure fluid into said chamber to distort the diaphragm and thereby move the shoe members inwardly toward said friction surface, each shoe member and its torque bar and spring being removable axially as an independent unit from both of said coaxial members upon removal of one of said end flanges.

6. In a fluid actuated friction clutch, the combination of: a pair of relatively rotatable coaxial members, the first member including a shell having an internal cylindrical friction surface, the second member including a rigid cylindrical torque-transmitting element provided with radially extending rims at the opposed ends thereof, each rim having an annular recess, the second member also having end flanges detachably secured to said rims, a flexible cylindrical diaphragm cooperating with said rigid cylindrical element to define an annular pressure chamber, the diaphragm having integral end portions extending radially inwardly at opposed ends thereof, each of said end portions having an axially directed lip extending into one of said annular recesses, said end portions being clamped axially in fluid-tight relationship between the ends of said rigid cylindrical element and said end flanges, a circumferential series of shoe members movable radially outwardly to engage said friction surface, torque bars each extending through one of said shoe members, a spring within each shoe member engaging the torque bar to move the shoe member away from its friction surface, means on the second member for introducing a pressure fluid into said chamber to distort the diaphragm and thereby move the shoe members outwardly toward said friction surface, each shoe member and its torque bar and spring being removable axially as an independent unit from both of said coaxial members upon removal of one of said end flanges.

References Cited in the file of this patent

UNITED STATES PATENTS

| | | |
|---|---|---|
| 1,690,543 | Linderman | Nov. 6, 1928 |
| 1,768,183 | Wine | June 24, 1930 |
| 2,166,165 | Linderman | July 18, 1939 |
| 2,193,481 | Fawick | Mar. 12, 1940 |
| 2,214,164 | Fawick | Sept. 10, 1940 |
| 2,229,922 | Heinze | Jan. 28, 1941 |
| 2,243,229 | Tarris | May 27, 1941 |
| 2,251,445 | Fawick | Aug. 5, 1941 |
| 2,288,631 | Linderman | July 7, 1942 |
| 2,311,113 | Klocke | Feb. 16, 1943 |
| 2,400,586 | Zimmermann | May 21, 1946 |
| 2,418,099 | Schmitter et al. | Mar. 25, 1947 |
| 2,422,121 | Norstrom et al. | June 10, 1947 |
| 2,626,020 | Keller | Jan. 20, 1953 |
| 2,637,345 | Kraft | May 5, 1953 |

FOREIGN PATENTS

| | | |
|---|---|---|
| 593,078 | Great Britain | Oct. 8, 1947 |